(12) United States Patent
Zambetti (10) Patent No.: US 8,432,656 B2
(45) Date of Patent: Apr. 30, 2013

(54) METHOD FOR FEEDBACK CONTROL AND RELATED FEEDBACK CONTROL LOOP AND VOLTAGE REGULATOR

(75) Inventor: Osvaldo Enrico Zambetti, Milan (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 360 days.

(21) Appl. No.: 12/797,309

(22) Filed: Jun. 9, 2010

(65) Prior Publication Data

US 2010/0315057 A1    Dec. 16, 2010

(30) Foreign Application Priority Data

Jun. 10, 2009   (IT) ............................... VA2009A0035

(51) Int. Cl.
- *G05F 1/00* (2006.01)
- *H02H 7/10* (2006.01)
- *H02H 7/00* (2006.01)
- *H02H 3/20* (2006.01)

(52) U.S. Cl.
USPC ............ 361/91.1; 323/284; 323/268; 363/50; 361/18

(58) Field of Classification Search .................. 323/268, 323/271, 288, 282, 284, 285, 901, 908; 363/50–58, 363/49; 361/18, 19.1
See application file for complete search history.

(56) References Cited

U.S. PATENT DOCUMENTS

| | | | | |
|---|---|---|---|---|
| 7,446,518 | B2 * | 11/2008 | Carpenter et al. | 323/285 |
| 2007/0108954 | A1 | 5/2007 | Qiu et al. | 323/284 |
| 2007/0229048 | A1 | 10/2007 | Zambetti et al. | 323/282 |
| 2007/0229049 | A1 | 10/2007 | Zafarana et al. | 323/282 |
| 2008/0290851 | A1 * | 11/2008 | Akashi et al. | 323/283 |

OTHER PUBLICATIONS

Caron, "Using diode emulation to reduce output voltage overshoot during a transient load release", Technical Brief, Nov. 2008, pp. 1-5.
Meyer et al., "An optimal control method for buck converters using a practical capacitor charge balance technique", IEEE Transactions, vol. 23, No. 4, Jul. 2008, pp. 1802-1812.

* cited by examiner

*Primary Examiner* — Bao Q Vu
*Assistant Examiner* — Zekre Tsehaye
(74) *Attorney, Agent, or Firm* — Allen, Dyer, Doppelt, Milbrath & Gilchrist, P.A.

(57) ABSTRACT

A feedback control method of a pulse width modulator (PWM) voltage converter may include generating a control voltage as a sum of an offset voltage and an error signal representing a difference between a scaled replica of a regulated output voltage of the voltage converter and a reference voltage, comparing the control voltage with a ramp signal, the comparing operation generating PWM driving signals for the voltage converter, comparing the regulated output voltage of the voltage converter with an overshoot threshold, and reducing the control voltage when the overshoot threshold is exceeded.

18 Claims, 12 Drawing Sheets

METHOD FOR FEEDBACK CONTROL AND RELATED FEEDBACK CONTROL LOOP AND VOLTAGE REGULATOR

FIELD OF THE DISCLOSURE

This disclosure relates in general to voltage converters, and more particularly, to a feedback control method of a voltage converter and relative control loop of a converter.

BACKGROUND

Figure 1:
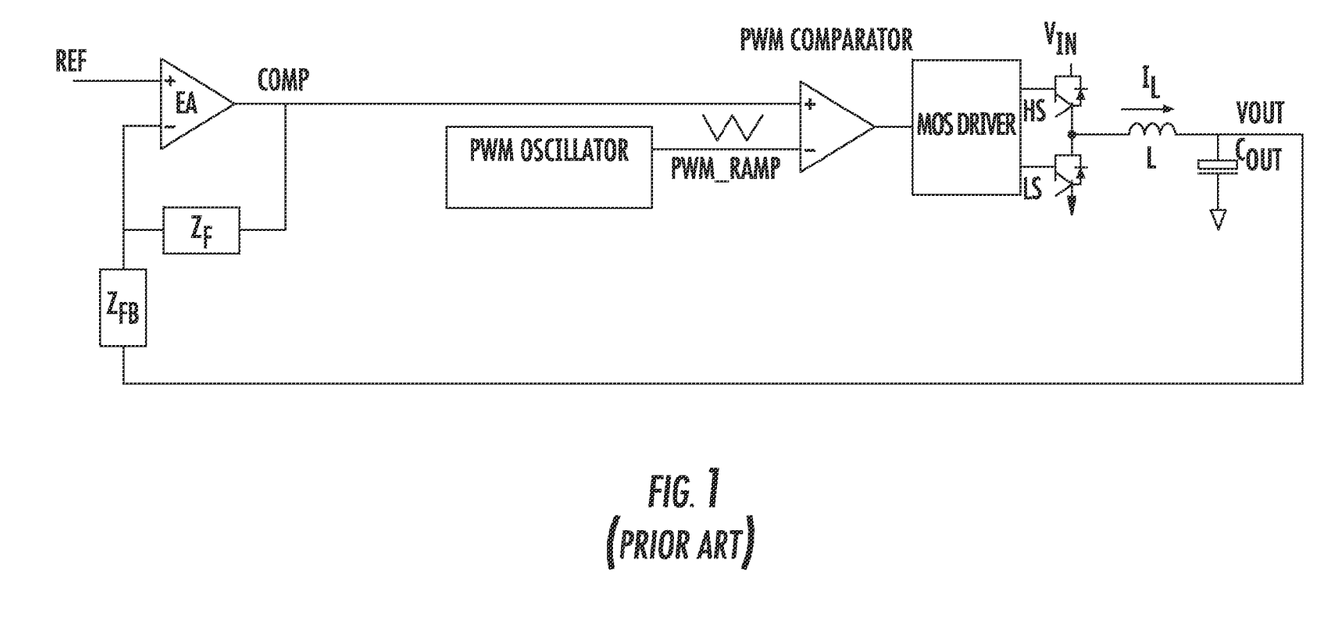
FIG. 1 is a block diagram of a regulation loop of a PWM voltage converter, according to the prior art.

Central processing units (CPUs) for personal computers, workstations, servers, graphic processor units (GPU) and memory controllers may use very complex controlled supply voltage generators. The supply voltage generators may be very precise both during an idle condition as well as during load transients. In general, supply voltage generators are input with a voltage of 5V or 12V and generate output voltages ranging from 0.5V to 2V. Mono-phase or multi-phase buck voltage converters, for example, of the type illustrated in FIG. 1, are generally preferred for these applications.

In order to effectively respond to very fast and large load transients (for CPU, up to 100 A in 50 ns) these converters need nonlinear controls that are enabled in presence of load transients and turn on simultaneously all the available phases for sustaining the output voltage.

Specifications for conditions of load transients may be restrictive during load increases as well as during load decreases and it may be advisable not to surpass the design maximum voltage. Independently from the fact that a mono-phase or a multi-phase converter is considered, the feedback network used for controlling the converter modifies the response to load changes. Depending on the fact that either linear or nonlinear techniques are used, as discussed in the U.S. Patent Application Publication No. 2007/0229048 to Zambetti et al., also assigned to the present application's assignee, the disclosure of which is incorporated by reference in its entirety, a converter may respond to a load transient by turning on all the phases (in case of a multi-phase) or only some of them. In any case, the response of the converter may be strongly dependent on the characteristics of the application's feedback network, and of the output filter (windings and capacitances), from the input voltage and from the type of modulation ramp (trailing edge, leading edge, dual edge and eventual nonlinear modulation systems) being used.

Specifications relating to windings, to the switching frequency, to the output capacitance and to the input voltage may be fixed when designing the integrated device. Nevertheless, in order to satisfy all specifications at critical load transients, it is often helpful to increase the output capacitance with a consequent added cost.

Figure 2:
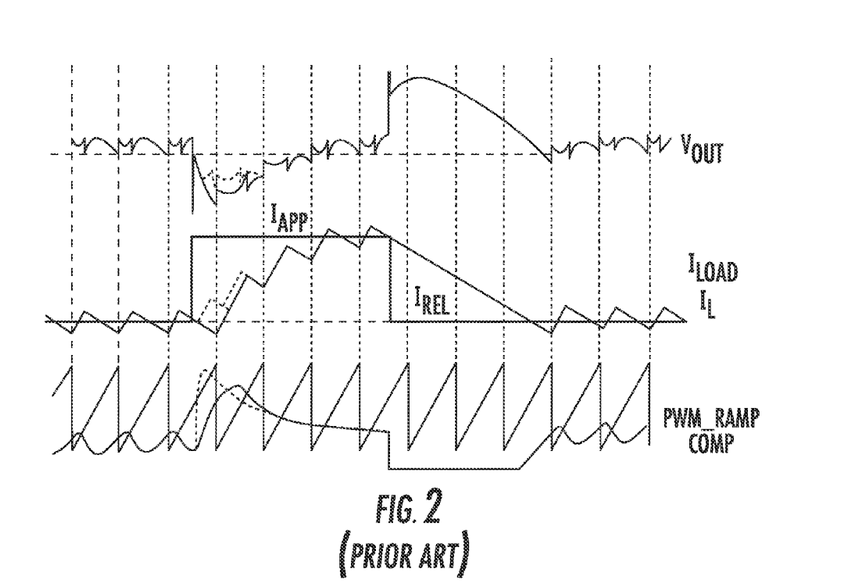
FIG. 2 is a graph showing the overshoot of the output voltage $V_{OUT}$ of the converter of FIG. 1 after a sharp reduction of the current used by a supplied load at low switching frequency.
Figure 3:
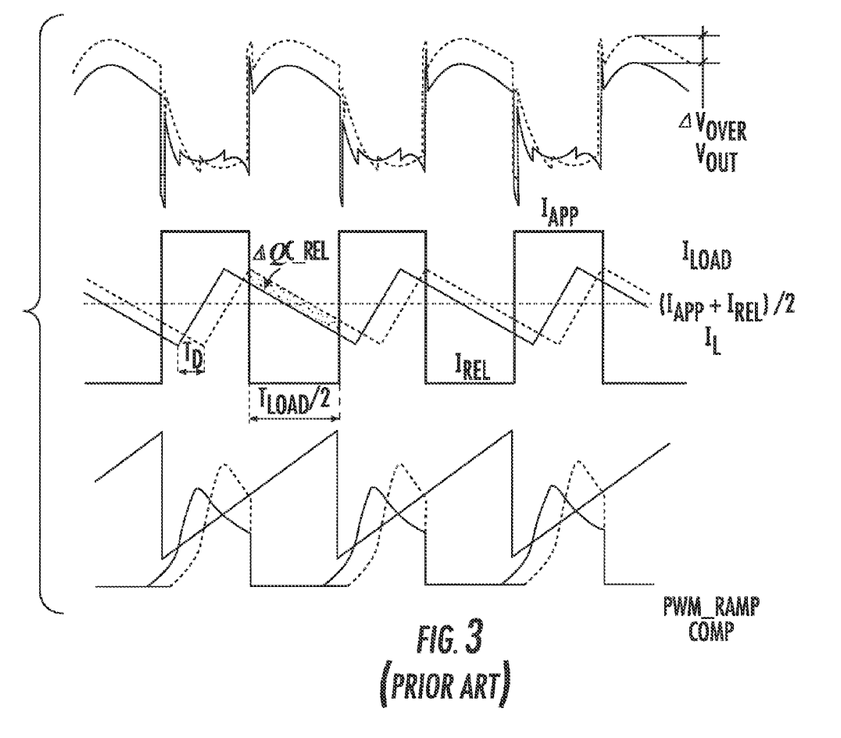
FIG. 3 is a graph showing the overshoot of the output voltage $V_{OUT}$ of the converter of FIG. 1 after a sharp reduction of the current used by a supplied load at high switching frequency.

Referring to FIG. 1, in order to respond effectively to a load variation, it is helpful to increase the control voltage (COMP) as fast as possible, thus with a large band, in order to always cross the modulation ramp (PWM_RAMP). Therefore, the gain during load transients may be sufficiently large. The effect of a large gain on the control voltage COMP may be useful at relatively low load transient frequency for making effective the response (as shown in FIG. 2 with a dashed line), though this may degrade the response of the system at medium/high load frequencies causing an overshoot on the output voltage and making it exit out of specifications imposed to the load, as illustrated in FIG. 3. The figure shows a qualitative example of the output voltage ($V_{OUT}$), of the current through the winding ($I_L$), of the modulation ramp (PWM_RAMP) and of the control voltage (COMP) at medium/large load frequency ($I_{LOAD}$) when the gain on the control voltage COMP varies, in a mono-phase system.

At medium/high frequencies, because of the significant time constant of the output filter, the current through the inductor is stable around the mean value of the two current levels ($I_{REL}$ and $I_{APP}$) used by the load. In absence of fluctuations between the load frequency and the switching frequency, that could be prevented for example, by suitably nonlinear systems, the output voltage may be driven with a constant duty-cycle.

As it may be inferred from the example shown, in order to keep the correct duty-cycle, the control system shifts its response toward the functioning zone of load reduction (i.e. transition from a high load current to a low load current) when the voltage gain of the block COMP increases, thus generating a delay in the closed loop response equal to $T_D$. By shifting the response, the excess charge in the inductor ($\Delta Q_{C\_REL}$) is supplied to the output capacitance, thus producing an overshoot of the voltage ($\Delta V_{OVER}$), i.e. an overshoot increases during the load reduction events that could systematically lead to the maximum output voltage being out of the specifications with consequences on the reliability of the device powered by the converter.

This charge may be estimated with the following formula:

$$\Delta Q_{C\_REL} = \frac{V_{OUT}}{2L} T_D \cdot T_{LOAD}$$

and may generate an overshoot equal to:

$$\Delta V_{OUT\_REL} = \frac{V_{OUT}}{2L \cdot C_{OUT}} T_D \cdot T_{LOAD}$$

From the examples of FIGS. 2 and 3, it is evident that a high gain compensation network in presence of transients may be good at low load frequency but could lead the system out of its specifications, as far as overshoot of the output voltage at medium/high load frequency is concerned.

Figure 4:
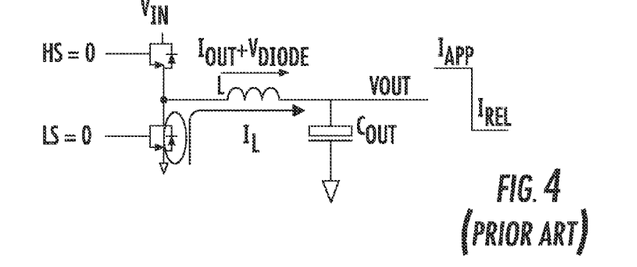
FIG. 4 illustrates the Diode Emulation technique for limiting overshoots of the output voltage of a PWM voltage converter, according to the prior art.
Figure 5:
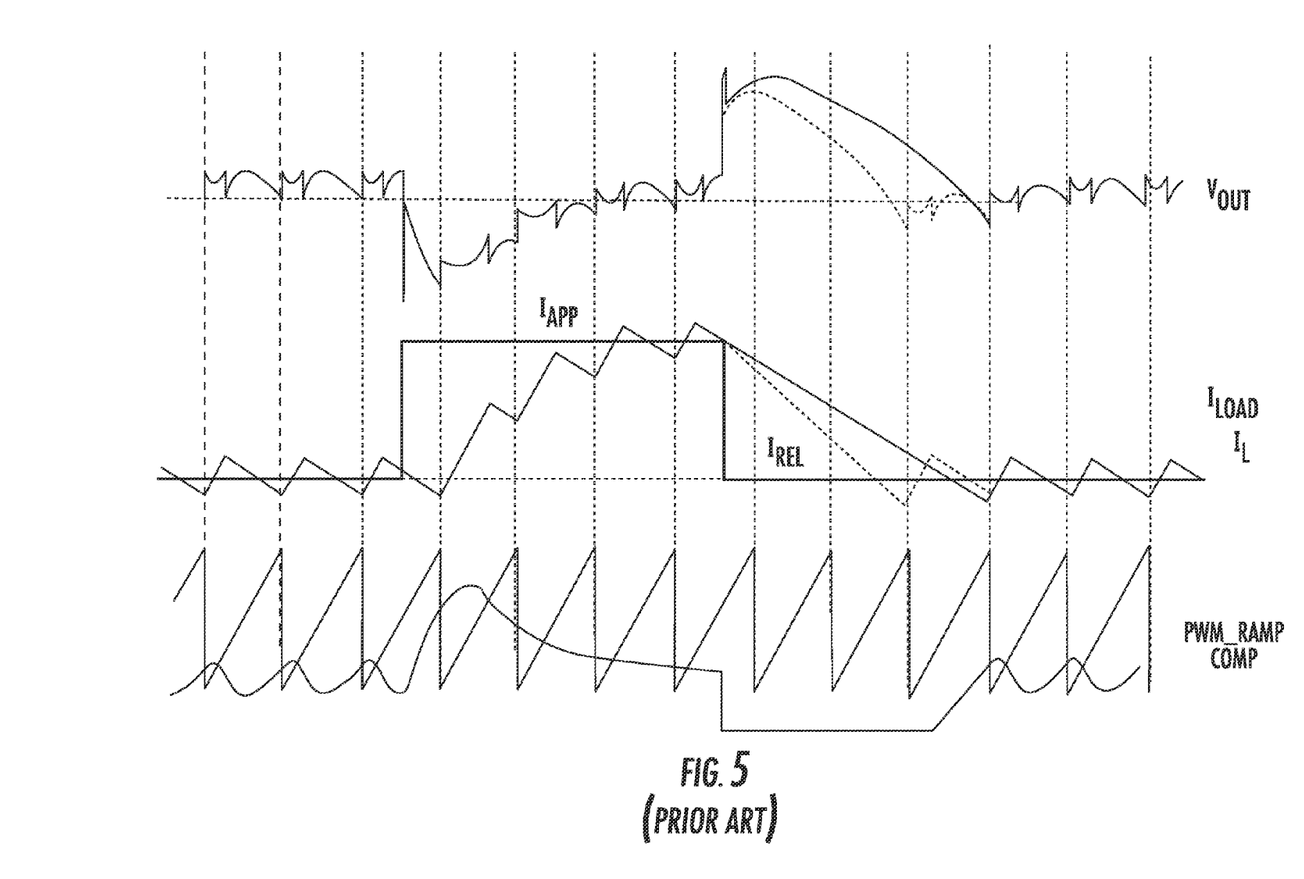
FIG. 5 is a time graph of the waveforms of the main signal of the converter of FIG. 4.

A known technique for reducing the overshoot of the output voltage during load reductions is known as "Body Brake" or "Diode Emulation." This technique is based on turning on the free-wheeling diode of the low side MOS (and in case of a multi-phase system of all the low-side MOS) for quickly demagnetizing the output inductors by discharging them with a voltage equal to $V_{OUT}+V_{DIODE}$ wherein $V_{DIODE}$ is the voltage of the free-wheeling diode of the low side MOS when turned on as shown in FIGS. 4 and 5. In order to turn on the free-wheeling diode during a load decrease, it is helpful to monitor the output (U.S. Patent Application Publication No. 2007/0229049 to Zafarana et al., also assigned to the present application's assignee) or, indirectly, the signal COMP for revealing when a load decrement is occurring and placing in a high impedance state both the low side as well as the high side MOS.

Figure 6:
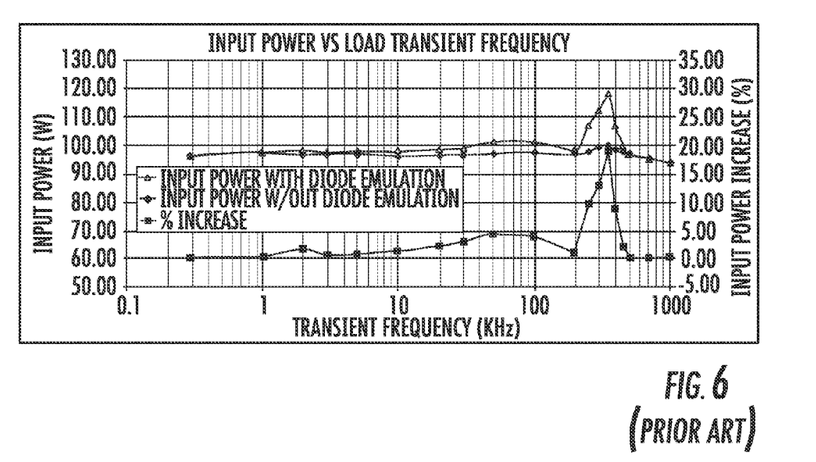
FIG. 6 is a graph illustrating the increase of power absorption at high switching frequency, according to the prior art.

Advantages and drawbacks of this technique are well illustrated in the reference authored by Don Caron and titled "Using Diode Emulation To Reduce Output Voltage Overshoot During a Transient Load Release," and herein incorporated by reference in its entirety. More particularly, this document may illustrate the helpfulness of the use of the Diode Emulation technique at medium/high load frequencies. Indeed, because of the overshoot due to the load reduction at medium/high frequencies (around 350 kHz in the example of FIG. 6), the increment of power consumption by the free-wheeling diode and thus by the low side MOS is particularly large, about 20% larger, and could even compromise thermal design of the application. In low cost designs where thermal design of the application is already done at extreme conditions, such an increment of dissipated power may be problematic.

SUMMARY OF THE DISCLOSURE

An object of the present disclosure may be to look for approaches that reduce overshoots due to load reductions at medium/high frequencies without affecting thermal dissipation of the application and without using the free-wheeling diode of the low side MOS.

An aspect is directed to a feedback control method of a voltage converter and a relative control loop for enhancing the response to a load transient, which may minimize overshoots of the output voltage at medium/high load frequencies when the control voltage (COMP) is below the modulation ramp during load application, independently from the compensation network and modulation ramp being used. According to the method, the gain of the control voltage (COMP) is not altered, rather its offset value may be reduced depending on whether the output voltage exceeds a pre-established design threshold. With this technique, the energy characteristics of the PWM converter may remain unchanged, but the beginning of the interval in which the converter may be energized is anticipated for contrasting overshoots of the output voltages. The method may be implemented in a structured control loop.

DETAILED DESCRIPTION OF THE PREFERRED EMBODIMENTS

The present disclosure is illustrated in a particular architecture of an exemplary voltage converter type, though, as may be apparent hereinafter, the same considerations hold also for voltage converters having a different architecture.

Figure 7:
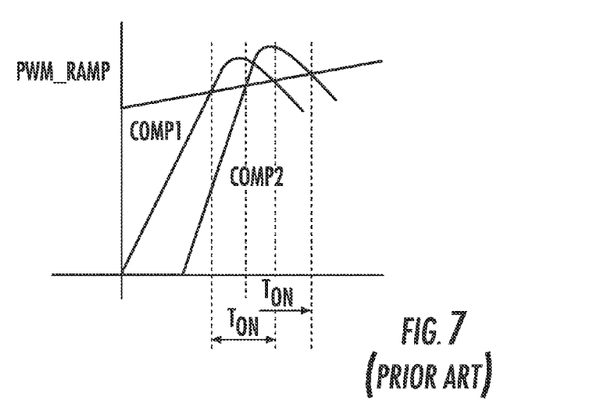
FIG. 7 is a time diagram that compares the effect of the increase of the gain of the control voltage in the unit time with the same on time $T_{ON}$ of the converter, according to the prior art.

In order to better understand the problem, it may be useful to analyze in the time domain the response of the control voltage COMP during a load transition. Looking at FIG. 7, it may be noticed how the response to the load application with higher gain shifts to the right toward the load decrease zone, as already discussed. The two voltages (COMP1 and COMP2), having different gains, may have initially a different slope and thus may cross at different instants the modulation ramp (PWM_RAMP).

Figure 8:
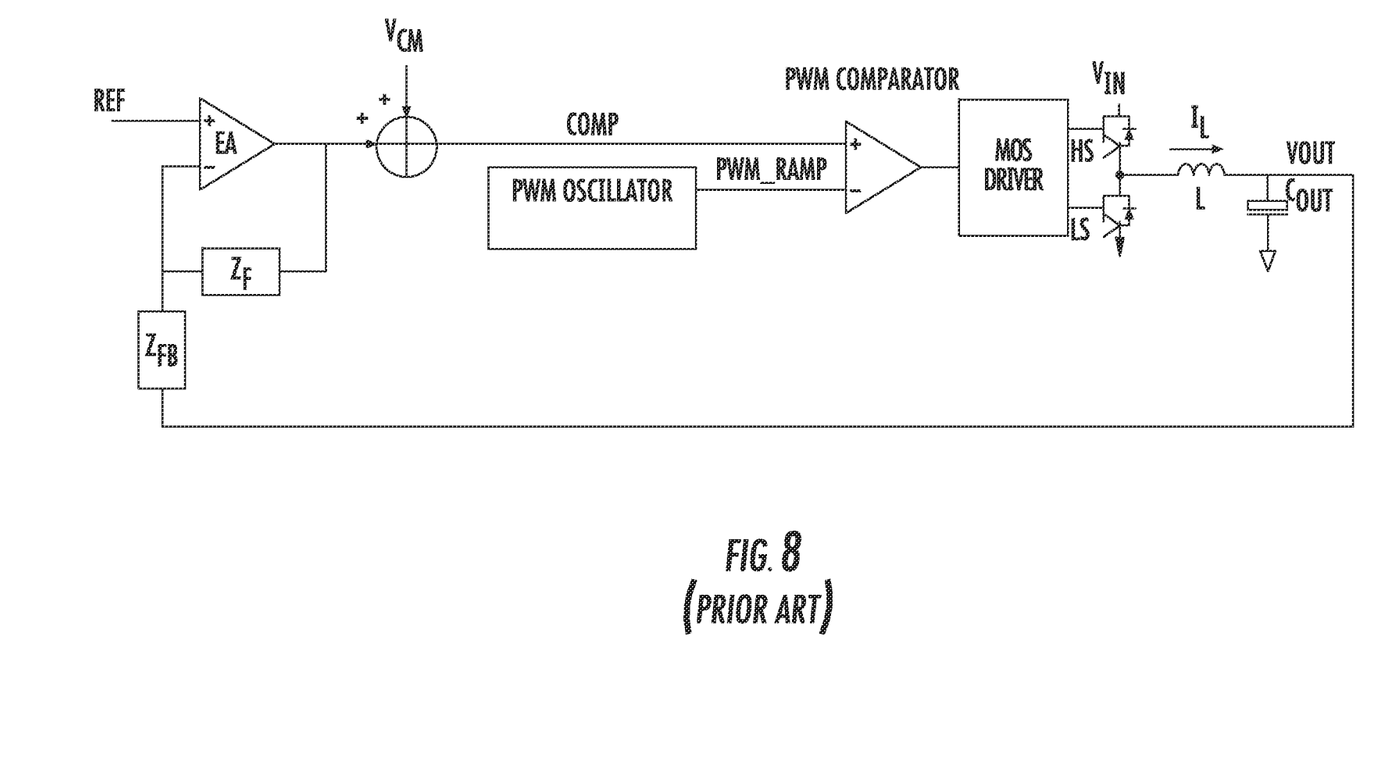
FIG. 8 is a block diagram of a voltage converter that comprises an adder of an offset voltage to the comparison signal, according to the prior art.
Figure 9:
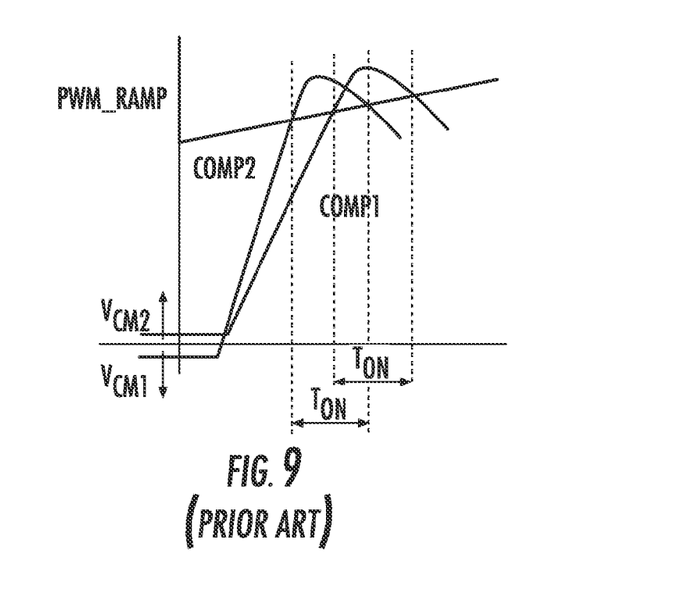
FIG. 9 is a time diagram that compares the combined effect of the addition of an offset signal to the comparison signal with the increment of the gain of the control voltage for a same energization time $T_{ON}$ of the converter of FIG. 8.

Even if the slopes are different, by introducing an offset on the output voltage of the error amplifier, as shown in FIG. 8, the control loop, in order to have the same $T_{ON}$ with the same gain, may shift the control voltage toward the load increase zone if the added offset is negative ($V_{CM1}$) or toward the load reduction zone if the added offset is positive ($V_{CM2}$), as shown in FIG. 9.

As may be noticed in FIG. 9, having added a positive offset to the control voltage of larger gain (COMP2) and a negative offset to the control voltage of smaller gain (COMP1), the system with the larger voltage may respond before the system with the smaller gain, i.e. the initial condition is reversed.

Indeed, the control voltage of the larger gain anticipates the control voltage of the smaller gain and, as previously described, this leads to a smaller overshoot of the output voltage at medium/high frequency during a load decrement. The introduction of a static offset (identified also as the common mode voltage $V_{CM}$) to the control voltage (COMP) significantly changes the transient response of the system. This behavior cannot be modeled in the frequency domain because the introduction of a static offset on the control voltage does not influence the frequency signal.

In order to better understand the effect of the introduced offset it is useful to study the load transient as a large signal and not as a small signal (as usually is done in a frequency analysis). When there is no overshoot on the output voltage, it is preferable to have the control voltage as close as possible to the modulation ramp for responding as fast as possible to a load application. Indeed, if the voltage COMP is smaller than the modulation ramp during application of the load, having a higher common mode voltage ($V_{CM0}$) helps reaching the ramp earlier and thus generating a PWM signal for responding to the transient.

Figure 10:
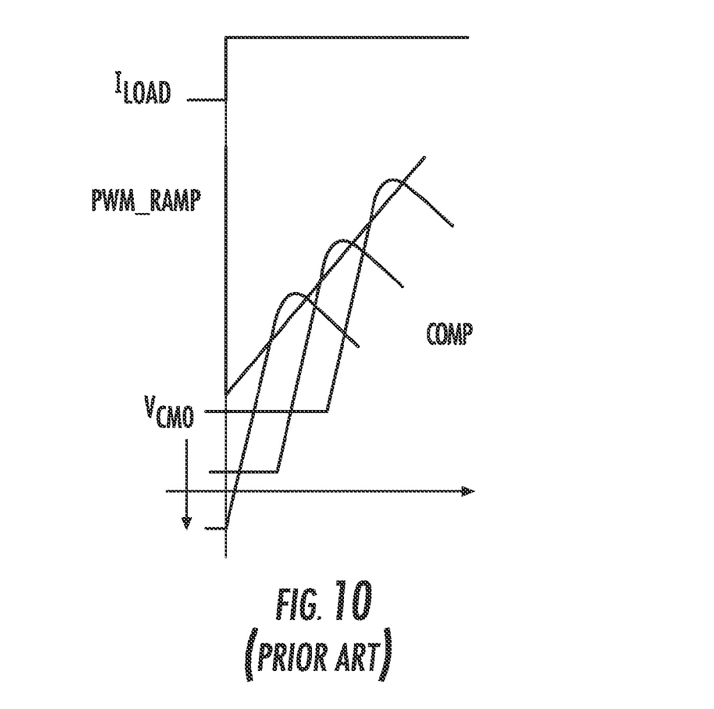
FIG. 10 illustrates the combined effect of the correction of the offset voltage of the comparison signal by keeping constant the energization time of the PWM voltage converter of the converter of FIG. 8.

In the presence of overshoots, independently from the gain on the control voltage, it is useful to add the common mode voltage with relatively small value or even of negative value for increasing the latency of the system and anticipating the response toward the load increase zone and not toward the load decrease zone, thus reducing the overshoot as far as keeping it within specifications. FIG. 10 illustrates the functioning principle.

Figure 11:
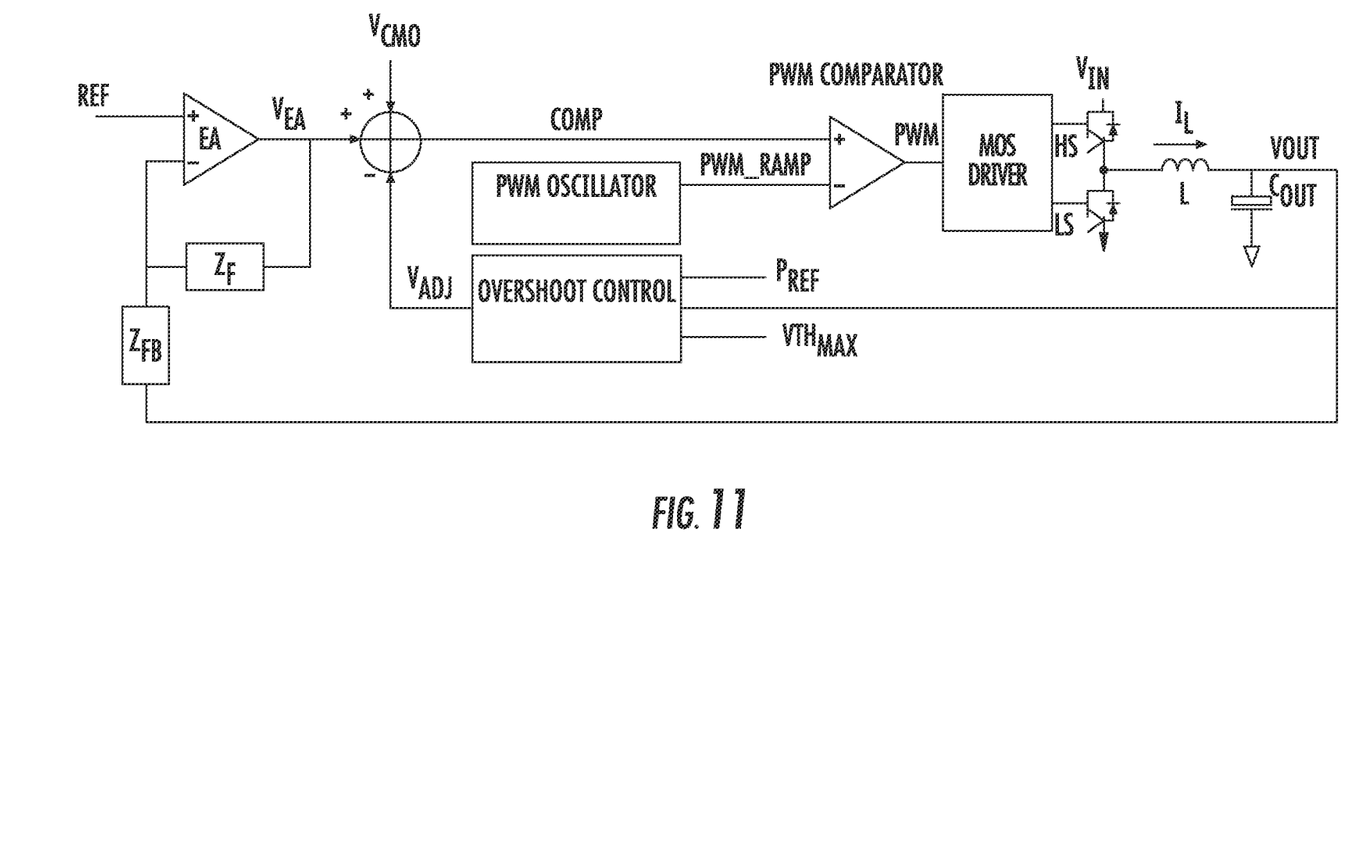
FIG. 11 depicts a control loop of a PWM voltage converter, according to the present disclosure.

The common mode voltage $V_{CM}$, also referred to as the offset voltage, that is added to the voltage COMP may be regulated by a control loop, for example, of the type illustrated in FIG. 11 to prevent the output voltage from exceeding a given maximum threshold. The overshoot control circuit is input with the output voltage $V_{OUT}$, with a threshold ($V_{TH\_MAX}$) that determines the maximum voltage value to be applied to the load, with a reference pulse signal $P_{REF}$ that may be generated by the system clock and with a ramp reset signal coming from the PWM OSCILLATOR or from the PWM driving signal of the converter.

Regulation of the common mode voltage to be added is done only in presence of overshoots on the output voltage, thus the response speed of the system at low/medium frequency when the voltage COMP is below the modulation ramp when a load is applied is not jeopardized.

Figure 12:
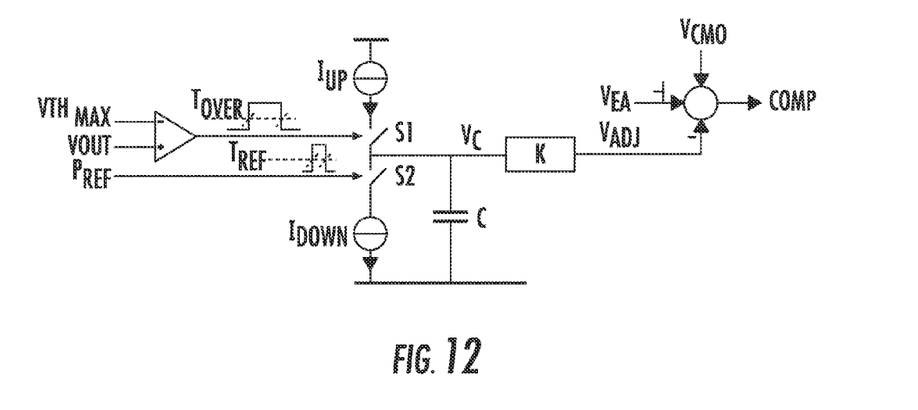
FIG. 12 illustrates an embodiment of the circuit of FIG. 11.

FIG. 12 illustrates a block diagram of the control circuit. Every time the voltage $V_{OUT}$ exceeds the threshold $V_{THMAX}$, a pulse of a duration $T_{OVER}$ closes the switch S1 and the capacitance C is charged with a current $I_{up}$. During this phase the voltage $V_c$ increases. When an externally generated command pulse $P_{REF}$ having a duration $T_{REF}$ is received, the switch S2 is closed and the capacitor C is discharged with a current $I_{DOWN}$. During this phase, the voltage VC decreases. If neither the pulse $P_{REF}$ nor the output signal of the overshoot comparator is received, the capacitor C keeps its charge and thus the voltage $V_c$ remains constant.

The voltage $V_c$ is multiplied by a gain factor K (for example, by introducing a filter for removing disturbances on the control voltage) generating the voltage $V_{ADJ}$. This voltage is subtracted from the output voltage of the error amplifier and the common mode voltage $V_{CM0}$ for reducing the control voltage COMP.

The effect of an increase of the voltage $V_{ADJ}$ on the control voltage COMP and thus on the overshoot of the system has been described hereinbefore. By diminishing the overshoot of the regulated output voltage, the time $T_{OVER}$ during which the output exceeds the threshold $V_{THMAX}$ decreases, with the effect of charging less the capacitor C.

When the system is in a steady-state condition, there is a charge equilibrium between the charge supplied during $T_{OVER}$ and the charge delivered during $T_{REF}$, thus:

$$T_{OVER} = \frac{I_{DOWN}}{I_{UP}} T_{REF}.$$

This means that the threshold $V_{THMAX}$ should be overcome for a period of time $T_{REF}$ in order to make the system work in closed loop conditions. If the voltage $V_{OUT}$ does not exceed the threshold $V_{THMAX}$, at each pulse $P_{REF}$, the capacitor is discharged with the current $I_{DOWN}$ for a time $T_{REF}$ up to discharge completely and restoring the control voltage COMP with maximum common mode voltage equal to $V_{CM0}$. It is thus possible to design the duration of $T_{REF}$, the threshold $V_{THMAX}$ and the charge and discharge currents $I_{up}$ and $I_{DOWN}$ with values adapted to satisfy load change specifications.

Figure 13:
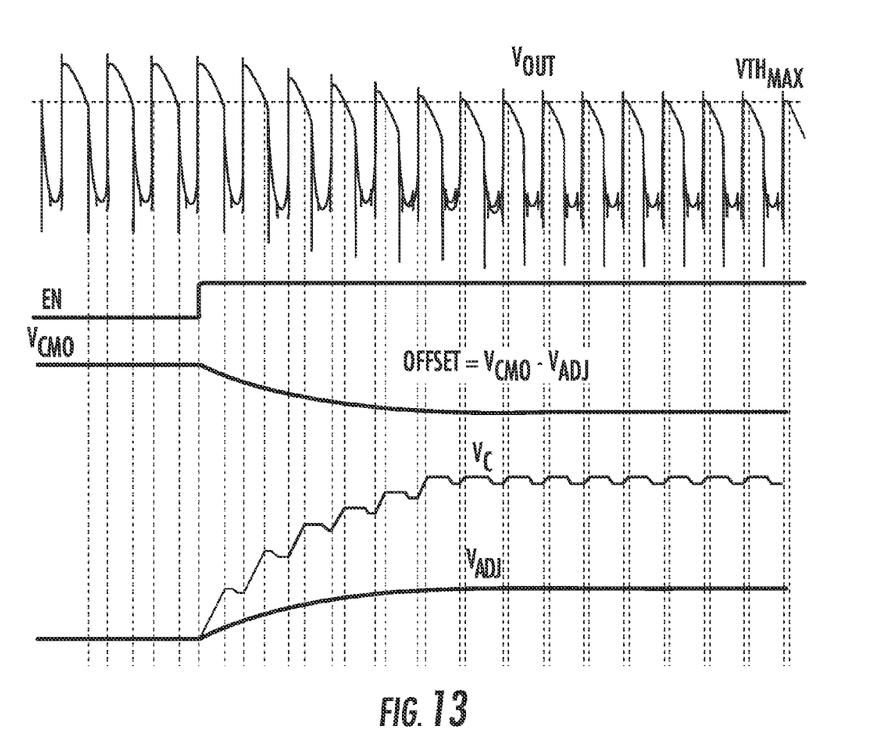
FIG. 13 is a time diagram of the signals of the circuit of FIG. 12 and of the output voltage $V_{OUT}$.

FIG. 13 illustrates a qualitative example of the functioning before and after the overshoot control system is enabled by the enabling signal EN. If the bandwidth of the overshoot control system is much smaller than the bandwidth of the output voltage regulation system, the signal $V_{ADJ}$ may be "seen" by the regulation system as a quasi-static signal, and thus, the interaction between the two control loops and the perturbation on the regulated output may be negligible. In this situation, it is common that the control loops are "almost orthogonal" to each other.

Figure 14:
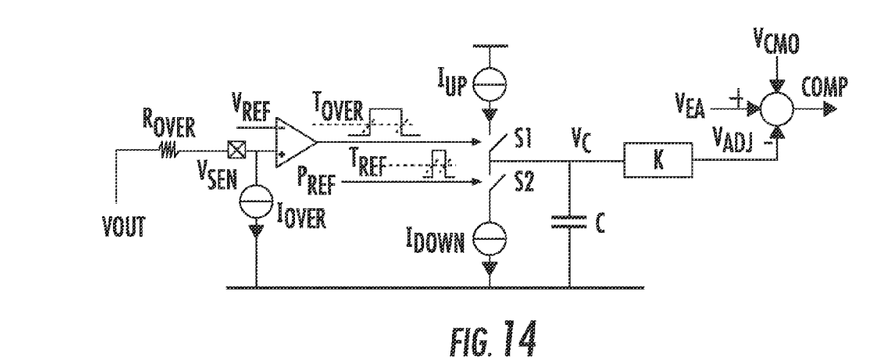
FIG. 14 illustrates another embodiment of the circuit of FIG. 11 with maximum threshold that may be set with the current generator $I_{OVER}$.
Figure 15A:
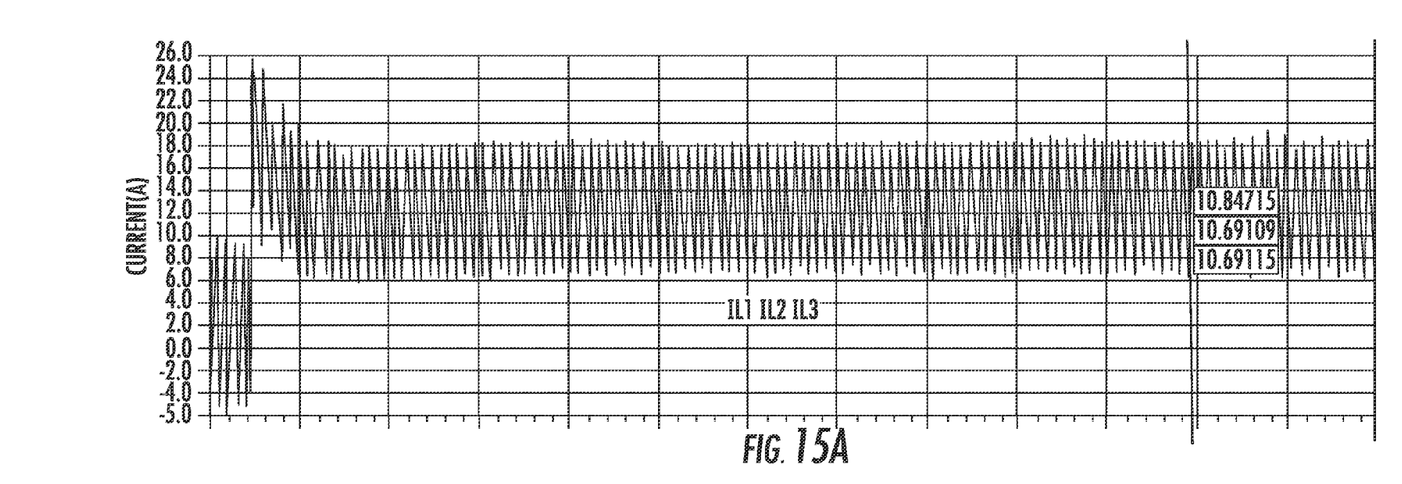
FIGS. 15A-15C are time diagrams of the main signals of a regulation loop of a three-phase PWM converter obtained through simulations by implementing the method, according to the present disclosure.
Figure 15B:
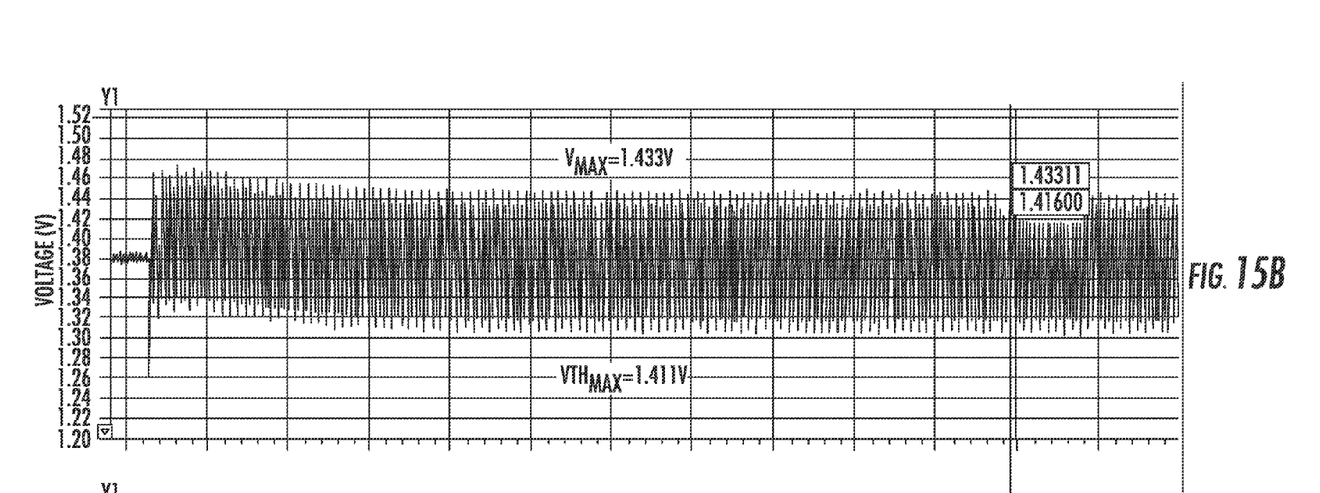
Figure 15C:
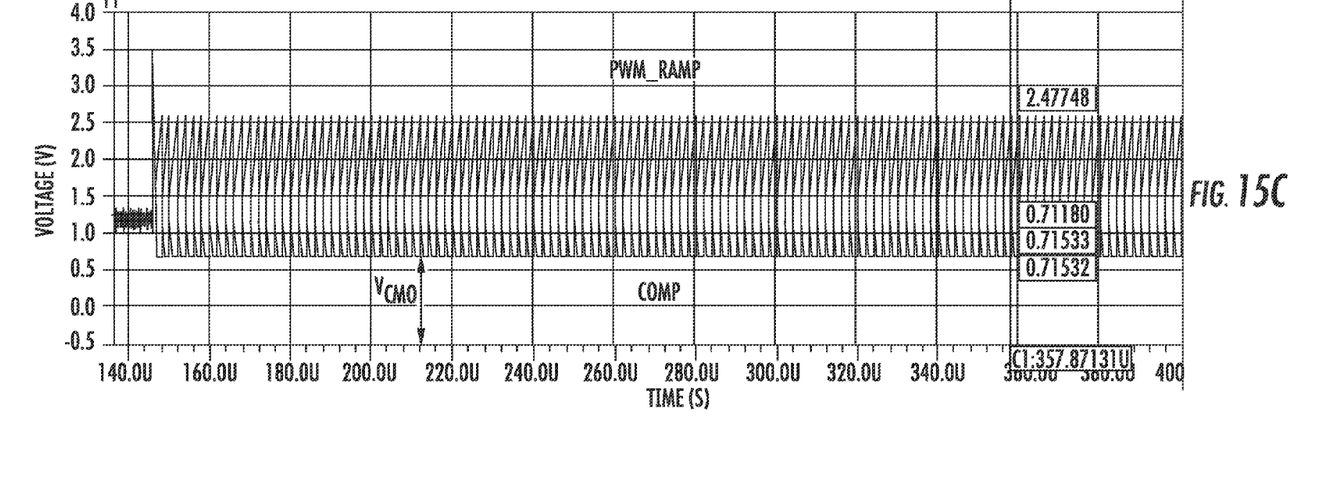
Figure 16A:
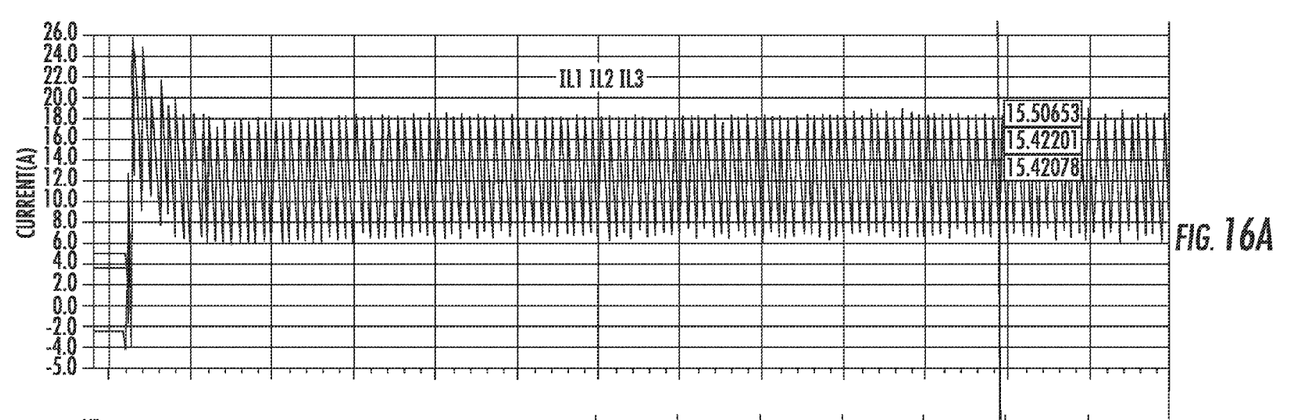
FIGS. 16A-16C are time diagrams of the main signals of a regulation loop of a three-phase PWM converter obtained through simulations having preliminarily disabled the circuit, according to the present disclosure.
Figure 16B:
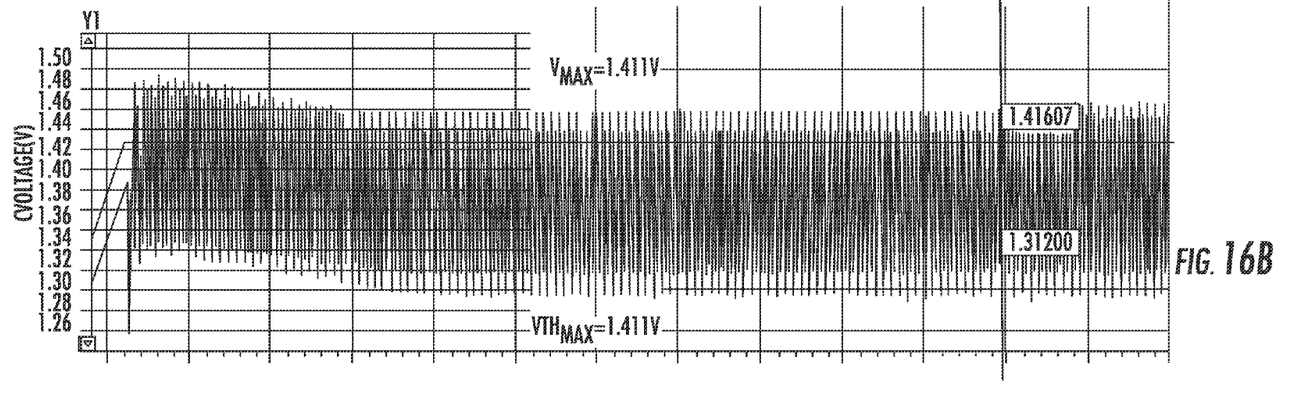
Figure 16C:
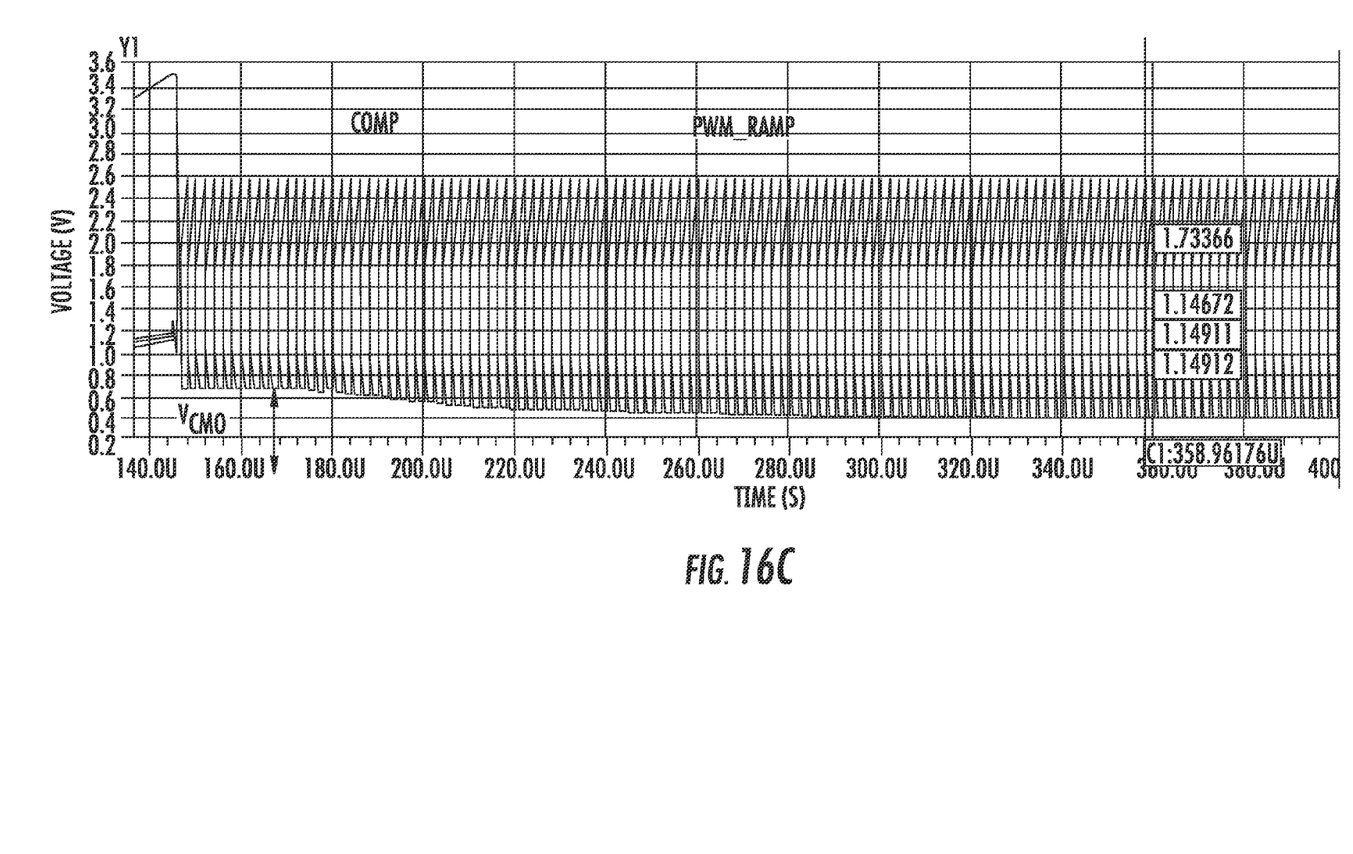

The overshoot threshold may be programmed through a commonly present sense terminal ($V_{SEN}$) of the output voltage, as shown in FIG. 14. By setting the negative terminal of the overshoot comparator at the $V_{REF}$ voltage, that is to the reference value of the output voltage regulation, and by introducing a current generator $I_{OVER}$ between the positive terminal of the comparator and ground, it is possible to program the threshold by introducing a resistor $R_{OVER}$ between the sense terminal of the output voltage and the terminal of the voltage $V_{OUT}$, as shown in FIG. 14. The maximum overshoot voltage, that is the threshold voltage $V_{THMAX}$, is:

$$VTH_{MAX} = V_{REF} + R_{OVER} \cdot I_{OVER}$$

In FIGS. 15A-15C and 16A-16C, two exemplary embodiments of simulation of the functioning of a three-phase converter (in this case the scale is not the same for the two embodiments) respectively with and without the overshoot control system of this disclosure. Notably, in the second embodiment the maximum voltage is smaller than in the first embodiment and is effectively limited to the threshold voltage $V_{THMAX}$.

That which is claimed is:

1. A feedback control method of a pulse width modulator (PWM) voltage converter, the method comprising:
generating a control voltage as a sum of an offset voltage and an error signal minus an adjustment signal, the error signal representing a difference between a scaled replica of a regulated output voltage of the voltage converter and a reference voltage;
comparing the control voltage with a ramp signal to generate PWM driving signals for the voltage converter;
comparing the regulated output voltage of the voltage converter with an overshoot threshold; and
reducing the control voltage and generating the adjustment signal when the overshoot threshold is exceeded by the regulated output voltage.

2. The method of claim 1 further comprising reducing the adjustment signal when a pulse command is asserted by an amount proportional to a duration of the pulse command.

3. The method of claim 1 wherein the overshoot threshold comprises a maximum overshoot threshold.

4. A feedback control loop for a pulse width modulator (PWM) voltage converter comprising:
an amplifier to generate an error signal as a difference between a scaled replica of a regulated output voltage of the voltage converter and a reference voltage;
a summer to generate a control voltage as a sum of the error signal and an offset voltage minus an adjustment signal;
a PWM comparator to be input with a ramp signal and the control voltage and to generate PWM driving signals for the voltage converter; and
a control circuit to
compare the regulated output voltage of the voltage converter with an overshoot threshold, and to reduce the control voltage and generate the adjustment signal when the overshoot threshold is exceeded by the regulated output voltage.

5. The feedback control loop of claim 4 wherein said control circuit comprises:
a tank capacitor and a charge/discharge circuit associated therewith; and a second threshold comparator to compare the regulated output voltage of the voltage converter with an overshoot threshold and to enable said charge/discharge circuit of said tank capacitor, the adjustment signal being produced on said tank capacitor.

6. The feedback control loop of claim 4 wherein said control circuit comprises:
a tank capacitor and a charge/discharge circuit associated therewith;
a resistor;
a current generator to be connected in series to said resistor on a terminal thereof not in common with the regulated output voltage; and
a second threshold comparator to compare a voltage on a common node between said current generator and said resistor with a reference voltage and to enable the charge/discharge circuit of said tank capacitor, the adjustment signal being produced on said tank capacitor.

7. The feedback control loop of claim 5 wherein said charge/discharge circuit comprises:
a charge switch;
a charge current generator to be connected to said tank capacitor through said charge switch enabled by said second threshold comparator;
a discharge switch; and
a discharge current generator connected to said tank capacitor through said discharge switch enabled by a discharge pulse input to said charge/discharge circuit.

8. The feedback control loop of claim 4 wherein the overshoot threshold comprises a maximum overshoot threshold.

9. A feedback control loop for a pulse width modulator (PWM) voltage converter comprising:
an amplifier to generate an error signal as a difference between a scaled replica of a regulated output voltage of the voltage converter and a reference voltage;
a summer to generate a control voltage as a sum of the error signal and an offset voltage minus an adjustment signal;
a PWM oscillator circuit to generate a ramp signal;
a PWM comparator to be input with the ramp signal and the control voltage and to generate PWM driving signals for the voltage converter;
a feedback circuit to be coupled between an output of said PWM comparator and an input of said amplifier and to generate the scaled replica of a regulated output voltage of the voltage converter; and
a control circuit to compare the regulated output voltage of the voltage converter with an overshoot threshold, and to reduce the control voltage and generate the adjustment signal when the overshoot threshold is exceeded by the regulated output voltage.

10. The feedback control loop of claim 9 wherein said control circuit comprises:
a tank capacitor and a charge/discharge circuit associated therewith; and
a second threshold comparator to compare the regulated output voltage of the voltage converter with an overshoot threshold and to enable said charge/discharge circuit of said tank capacitor, the adjustment signal being produced on said tank capacitor.

11. The feedback control loop of claim 9 wherein said control circuit comprises:
a tank capacitor and a charge/discharge circuit associated therewith;
a resistor;
a current generator to be connected in series to said resistor on a terminal thereof not in common with the regulated output voltage; and
a second threshold comparator to compare a voltage on a common node between said current generator and said resistor with a reference voltage and to enable the charge/discharge circuit of said tank capacitor, the adjustment signal being produced on said tank capacitor.

12. The feedback control loop of claim 10 wherein said charge/discharge circuit comprises:
a charge switch;
a charge current generator to be connected to said tank capacitor through said charge switch enabled by said second threshold comparator;
a discharge switch; and
a discharge current generator connected to said tank capacitor through said discharge switch enabled by a discharge pulse input to said charge/discharge circuit.

13. The feedback control loop of claim 9 wherein the overshoot threshold comprises a maximum overshoot threshold.

14. A voltage regulator comprising:
a driver; and
a feedback control loop coupled to said driver and comprising
an amplifier to generate an error signal as a difference between a scaled replica of a regulated output voltage of the voltage converter and a reference voltage,
a summer to generate a control voltage as a sum of the error signal and an offset voltage minus an adjustment signal,
a pulse width modulator (PWM) comparator to be input with a ramp signal and the control voltage and to generate PWM driving signals for the voltage converter, and
a control circuit to compare the regulated output voltage of the voltage converter with an overshoot threshold, and to reduce the control voltage and generate the adjustment signal when the overshoot threshold is exceeded by the regulated output voltage.

15. The voltage regulator of claim 14 wherein said control circuit comprises:
a tank capacitor and a charge/discharge circuit associated therewith; and
a second threshold comparator to compare the regulated output voltage of the voltage converter with an overshoot threshold and to enable said charge/discharge circuit of said tank capacitor, the adjustment signal being produced on said tank capacitor.

16. The voltage regulator of claim 14 wherein said control circuit comprises:
a tank capacitor and a charge/discharge circuit associated therewith;
a resistor;
a current generator to be connected in series to said resistor on a terminal thereof not in common with the regulated output voltage; and
a second threshold comparator to compare a voltage on a common node between said current generator and said resistor with a reference voltage and to enable the charge/discharge circuit of said tank capacitor, the adjustment signal being produced on said tank capacitor.

17. The voltage regulator of claim 15 wherein said charge/discharge circuit comprises:
a charge switch;
a charge current generator to be connected to said tank capacitor through said charge switch enabled by said second threshold comparator;
a discharge switch; and a discharge current generator connected to said tank capacitor through said discharge switch enabled by a discharge pulse input to said charge/discharge circuit.

18. The voltage regulator of claim 14 wherein the overshoot threshold comprises a maximum overshoot threshold.

* * * * *